United States Patent [19]

Tachi et al.

[11] 4,282,552
[45] Aug. 4, 1981

[54] APPARATUS FOR REPRODUCING A VIDEO SIGNAL INCLUDING AN ADDRESS SIGNAL WHEN THE VIDEO TAPE MOVES AT VARIOUS SPEEDS

[75] Inventors: Katsuichi Tachi, Kawasaki; Ichiro Ninomiya, Hatano; Jun Takayama, Kokubunji, all of Japan

[73] Assignee: Sony Corporation, Tokyo, Japan

[21] Appl. No.: 49,546

[22] Filed: Jun. 18, 1979

[30] Foreign Application Priority Data

Jun. 19, 1978 [JP] Japan .................................. 53-74037

[51] Int. Cl.³ ........................ H04N 5/78; G11B 21/02
[52] U.S. Cl. ..................................................... 360/70
[58] Field of Search ...................... 358/147; 360/9, 10, 360/11, 14, 49, 70, 72.2, 75, 76, 77, 36

[56] References Cited
U.S. PATENT DOCUMENTS

| 3,562,427 | 2/1971 | Yano et al. | 360/70 |
| 3,678,186 | 7/1972 | Narita | 360/70 |
| 3,887,941 | 6/1975 | Dann et al. | 360/36 |
| 4,044,388 | 8/1977 | Metzger | 360/70 |
| 4,127,881 | 11/1978 | Wakami et al. | 360/70 |
| 4,134,130 | 1/1979 | Tachi | 358/147 |
| 4,163,262 | 7/1979 | Kaemmerer | 360/14 |

Primary Examiner—John H. Wolff
Assistant Examiner—Donald McElheny, Jr.
Attorney, Agent, or Firm—Hill, Van Santen, Steadman, Chiara & Simpson

[57] ABSTRACT

A video signal reproducing apparatus capable of reproducing parallel record tracks formed on a tape which are scanned by a rotary head and wherein track address signals are recorded on respective vertical blanking interval sections of the record tracks which can be read out and displayed even though the tape moves at various speeds comprising a detecting means for detecting when said track address signals are not being read out and including shifting means for shifting the relative position of the rotary heads relative to the tape when the output of the detecting means continues longer than a predetermined time so as to assure that the address signals will be read at varying speeds of the tape.

6 Claims, 10 Drawing Figures

APPARATUS FOR REPRODUCING A VIDEO SIGNAL INCLUDING AN ADDRESS SIGNAL WHEN THE VIDEO TAPE MOVES AT VARIOUS SPEEDS

BACKGROUND OF THE INVENTION

1. Field of the Invention

The present invention relates in general to video signal reproducing apparatus and in particular to improved apparatus for assuring that the address signal recorded on video tape can be read out at various tape speeds.

2. Description of the Prior Art

Video tape reproducing machines are known which include apparatus in which a pair of heads are rotated so as to read slant tracks formed on the tape as the tape is passed through the machine.

SUMMARY OF THE INVENTION

The present invention includes means for detecting the reproduced video signal including a rotating head arrangement which moves relative to the tape to read slant tracks recorded on the tape and further includes a video tape code decoder for detecting the code on the tape and further includes a timer and a comparator which respectively receives the output of the decoder and wherein the timer supplies an input to the comparator and the comparator supplies an output to a control circuit which adjusts the phase or the speed or the relative position of the heads relative to the tape so that the various code signals will be correctly reproduced and detected.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

This invention relates to a video signal reproducing apparatus in which when parallel record tracks formed on a tape are scanned by a pair of rotary heads, the track address signals which are recorded on respective vertical blanking interval sections of the parallel tracks can be read out by the rotary head and provided to a display means where they are displayed.

The prior art devices have had video signals recorded on magnetic tape in which time codes functioning as indexes for the video signal are recorded on the magnetic tape which could be used, for example, for electronic editing.

One example of such sound tracks or cue tracks recorded on magnetic tape is the so-called "SMPTE time code". Also, there is a VITC signal which is used as a time code and which this invention relates to.

Figure 1:
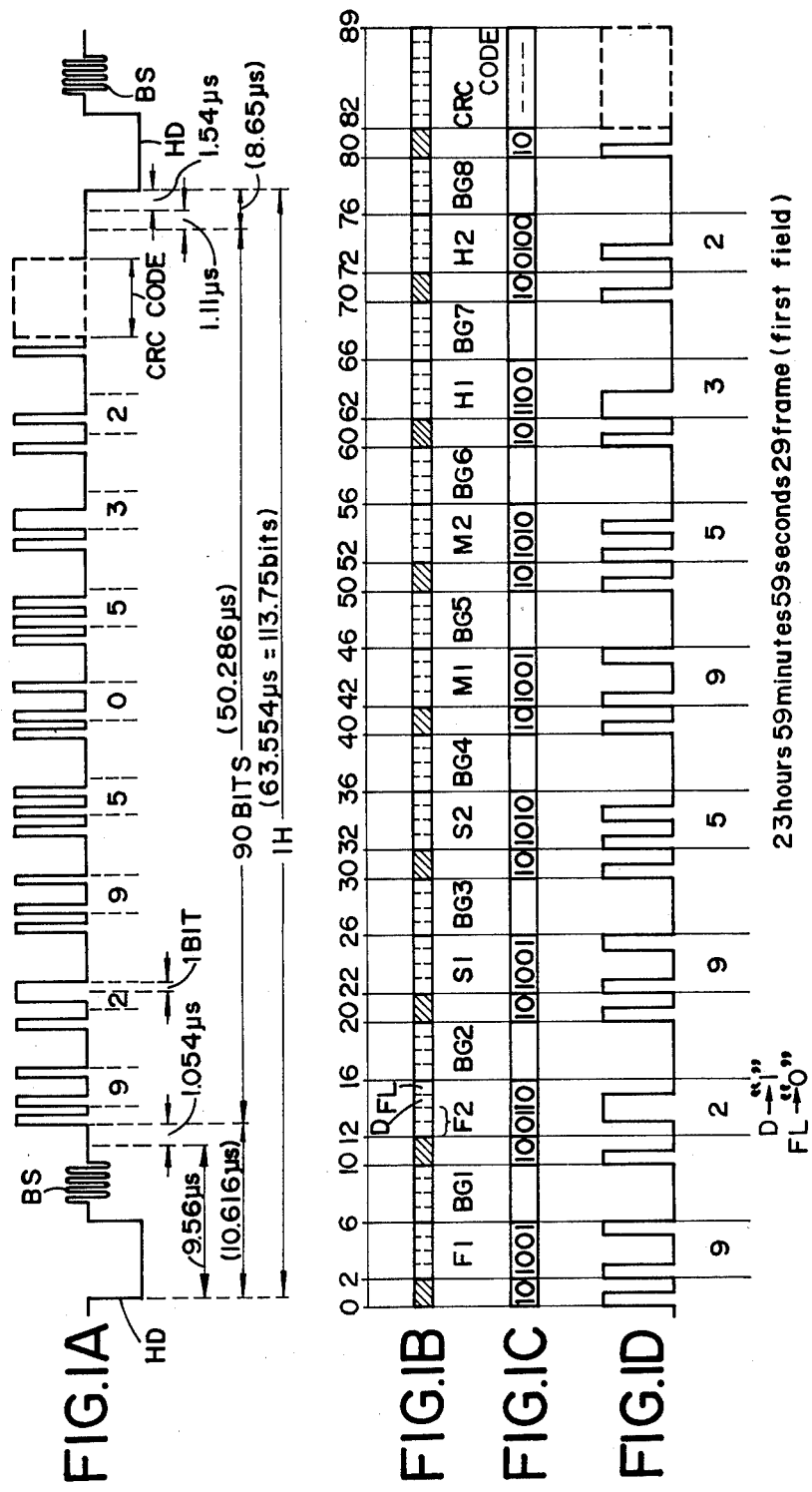
FIGS. 1A through 1D illustrate the VITC signal.

The VITC signal is recorded on the magnetic tape in a manner which is different from the SMPTE time code. The VITC signal is mixed with the video signal and recorded in the video signal track on the magnetic tape. It is continuously inserted, for example, in one horizontal interval section after a post group equalizing pulse interval section is a vertical blanking time section. A one horizontal interval (1H) is illustrated in FIG. 1A. In FIG. 1A, HD represents a horizontal synchronizing signal and BS represents a burst signal. A time starting signal 1.54 $\mu s$ prior to the front edge of the horizontal synchronizing pulse HD until a second time which is 9.56 $\mu s$ after the front edge of the horizontal signal HD defines one horizontal blanking interval. A VITC signal for a particular field is inserted in a video interval which is shorter by an amount equal to the horizontal blanking interval than the interval 1H.

The bit frequency $f_b$ of the VITC signal is determined as follows:

$$f_b = (455/4) f_h \approx 1.79 \text{ [MHz]}$$

where $f_h$ represents the horizontal scanning frequency. Thus, the interval of 1H corresponds to 113.75 bits. The VITC signal of 90 bits is recorded on one record track. The code arrangement of the VITC signal is illustrated in FIG. 1B. Synchronizing bit portions each having two bits are shown by oblique lines and are arranged at intervals of ten bits. For example, in FIG. 1B, the synchronizing bit portions are between bits 0 and 2, 10 and 12, 20 and 22, 30 and 32, 40 and 42, 50 and 52, 60 and 62, 70 and 72, and 80 and 82. Predetermined bit values (1,0) are given to the synchronizing bits. 4 bits after the first synchronizing bits 2 bits are allocated to the frame code $F_1$. The frame code $F_1$ represents a number of single digits of the frame address such as for example (0, 1, 2–9). The frame code $F_2$ represents a single digit of the 10 Figures related to the frame address as, for example, (10, 20, 30–) and $F_2$ located after bits 10–12.

One bit after the frame code $F_2$ is selected as a drop frame bit D. The next bit after the drop frame bit D is designated a field code FL. A value of "0" is given to the field code FL for the first field of one frame, and another value of "1" is allocated to the field code FL for the second field of the number 1 frame. Two groups of 4 bits after the third and fourth synchronizing bit portions are used for second codes $S_1$ and $S_2$ respectively. Two portions of 4 bits after the fifth and sixth synchronizing bit portions are used for minute codes $M_1$ and $M_2$ respectively and these codes indicated the time and minutes for the particular address. Two portions of 4 bits after the seventh and eighth synchronizing bit portions are allocated for the hour codes $H_1$ and $H_2$. In the minute and hour codes first portions $M_1$ and $H_1$ designate the units of minutes and hours respectively, and the second portions $M_2$ and $H_2$ designate the number of tens of the minutes and hours, respectively.

Eight groups of 4 bits each are allocated to user-bit portions designated BG1 through BG8 in FIG. 1B. An error detecting code indicated for example as CRC (Cyclic Redundancy Check) code of 7 bits follows the last of the synchronizing bit portions between bit 82 and bit 89 as shown in FIG. 1B.

FIG. 1C illustrates a read-out of the binary numbers associated with the various codes identified above for a particular embodiment of the VITC signal. FIG. 1D illustrates waveforms associated with the example given in FIG. 1C and the particular embodiment the time codes read 23 hours 59 minutes 59 seconds 29 frame. The values of the drop frame bit D is "1" and the field code FL is "0". As contrasted to the SMPTE time code, the VITC signal is recorded on the video track and it can be positively read out even in slow reproduction mode and still reproduction mode.

Figure 2:
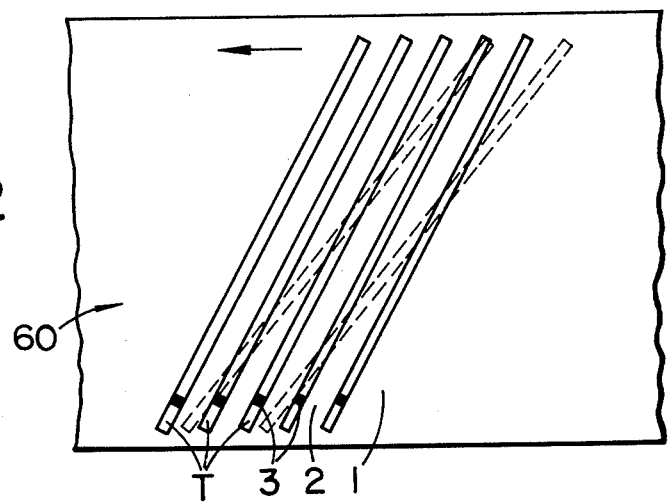
FIG. 2 is a partial plan view of the video tape illustrating various slant tracks formed thereon.

FIG. 2 is a plan view of a part of a magnetic tape 60 on which the VITC signals are recorded. The plurality of parallel/record tracks T are formed at predetermined intervals and each represent one field on the magnetic tape. A guard band 2 is formed between two adjacent record tracks T. The VITC signal is recorded in the vertical blanking interval section of each of the record tracks T. In the video tape recorder-reproducer which reads out the VITC signal and displays the frame number during reproduction of video signals from the magnetic tape 1, at times the magnetic tape 1 will be in the fast forward transport mode or in the rewind mode so as to position the tape to a particular portion for reference or electronic editing. When this occurs, if the tape running speed is set to a multiple of or nearly a multiple of the normal record or reproduction tape running speeds, it is possible that the rotary head will not scan the record portion of the VITC signal 3 but will scan the guard band 3 between the recorded signals or record tracks T and in this event, the VITC signal cannot be read from the tape.

It is an object of the present invention to solve this problem. According to the invention, even if the tape running speed differs from the normal record or reproduction tape running speed, a track address signal can be accurately read from the tape.

Figure 3:
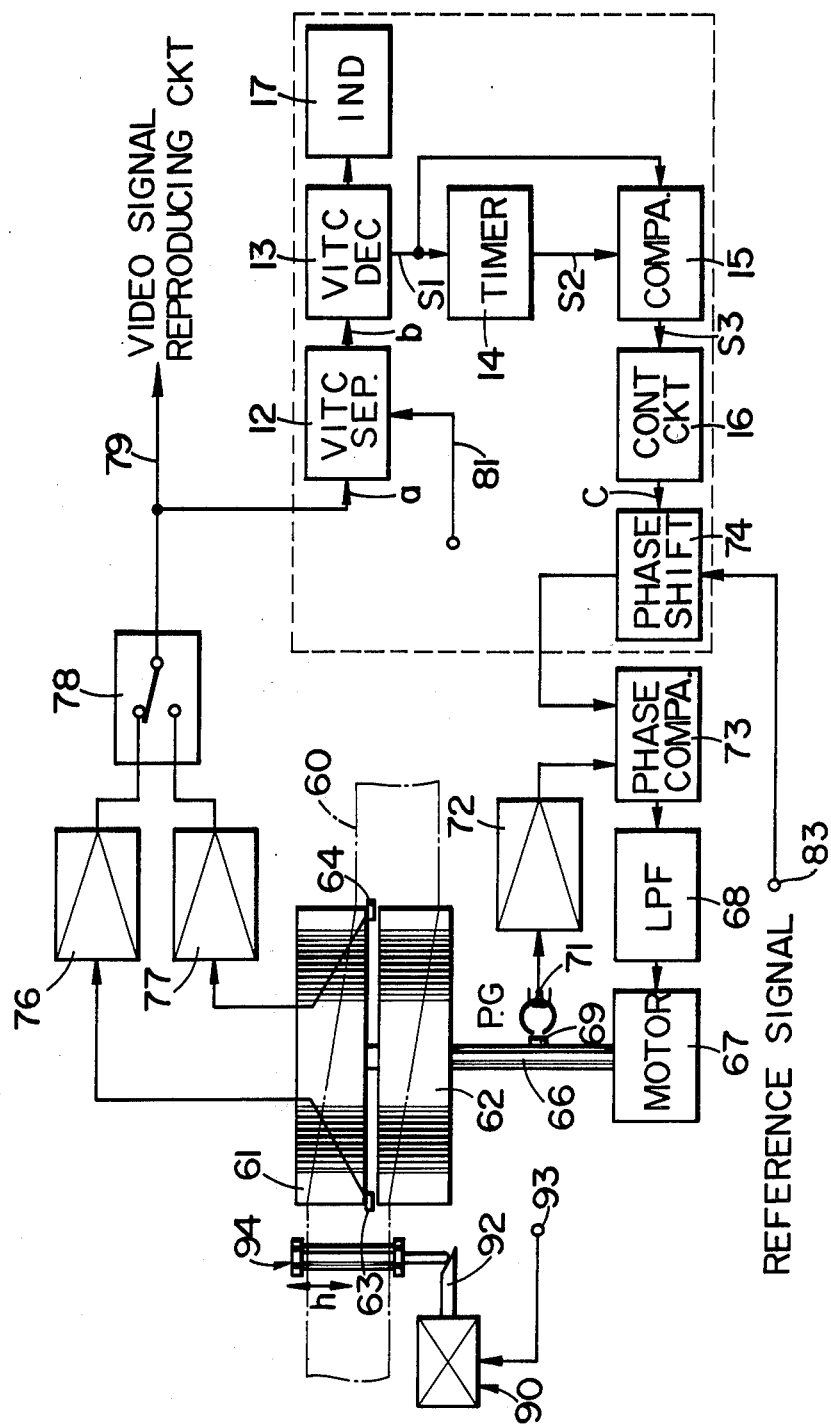
FIG. 3 comprises a block diagram of a frame number display apparatus according to one embodiment of the invention.

FIG. 3 illustrates one embodiment of the invention for accomplishing these results.

FIG. 3 illustrates a video tape recorder VTR and the tape 60 passes around an upper drum 61 and a lower drum 62 where it is scanned by a pair of magnetic heads 63 and 64 which produce signals that are fed to amplifiers 76 and 77. Switching means 78 is connected to the amplifiers 76 and 77 and provides an output video signal on lead 79. The reproduced video signal a from lead 79 is also supplied to a VITC signal separating circuit 12 which is a gate circuit operating at a predetermined timing, and which receives a gate signal on lead 81. A separated VITC signal b is applied from the output of the separator 12 to a VITC decoder 13 which supplies an output to a display unit 17 which indicates the decoded address information which is detected such as the seconds, minutes, hours and frame or field of the VITC information.

When the relationship between the record track T and the head scanning path is as shown in solid line in FIG. 2, the VITC signal will be properly read out and indicated by the indicator 17. On the other hand, if the path of the scanning heads 63 and 64 corresponds to the dotted line position relative to the tape shown in FIG. 2, the proper VITC signal will not be correctly read from the tape by the heads. When this condition exists, an error signal $S_1$ indicated in FIG. 4A will be formed in the VITC decoder or read out circuit 13. The error signal $S_1$ may be formed by detecting the CRC code contained in the VITC signal. Alternatively, when the head scanning path is greatly deflected from the VITC recorded portion, the error signal $S_1$ may be formed by detecting the greatly deflected head scanning path. Alternatively, the error signal $S_1$ may be formed by detecting the level of the reproduced FM wave when the level of the reproduced FM wave is lower than a predetermined level.

Figure 4A:
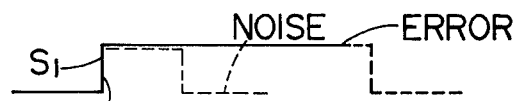
FIGS. 4A through 4D illustrate waveforms of various signals at different points in FIG. 3.
Figure 4B:
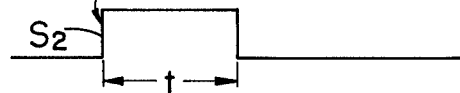
Figure 4C:
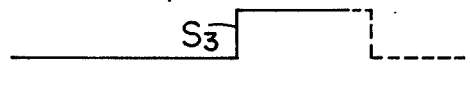

The error signal $S_1$ is supplied to a comparator 15 from the decoder 13 and is also supplied to a timer 14. The timer, for example, may be a monostable multivibrator which produces a high level signal which continues for the predetermined time starting in synchronization with the leading edge of the error signal $S_1$. A signal $S_2$ illustrated in FIG. 4B which continues at a high level for a time interval t which can be, for example, several times as long as the vertical scanning period and which starts from the leading edge of the error signal $S_1$ as illustrated in FIGS. 4A and 4B. The signal $S_2$ from the timer 14 is supplied to the comparator which produces an output signal $S_3$ shown in FIG. 4C which is high when either of the signals $S_1$ or $S_2$ have dropped to zero and the other signal is still high. In other words, the signal $S_3$ indicates the additional length that the signal $S_1$ has relative to the timing output signal $S_2$.

A control or driver circuit 16 receives the output signal $S_3$ and produces a control signal c which can be used to shift the rotational speed of the rotary drum of the VTR based on the output signal $S_3$. The control signal c may be used as a signal to shift the phase of the reference pulse of 60 cycles that is applied to a reference terminal 83 and to a phase shift device 74 which also receives the control signal c from the control circuit 16. A phase comparator 73 receives the output of the phase shift circuit 74 as well as an input from an amplifier 72 which receives an input from a detector 71 that picks up a magnetic reference signal from a magnetic element 69 on the shaft 66 on the output of the motor 67 which drives the drums 61 and 62. The phase comparator 73 produces an output signal which is supplied to the motor 67 through a low pass filter 68 to cause the motor 67 to drive the drums at a speed such that the VITC signal can be properly read.

Figure 4D:

In other words, when the signals $S_1$ and $S_2$ are not of the same length and an error signal $S_3$ is produced as illustrated FIG. 4D, the motor 67 will be driven at a proper speed so as to cause the scanning heads 63 and 64 to coincide with the tracks T on the video tape 60 so that the address signals can be read from the tape.

Instead of controlling the rotary drum motor 67, alternative methods of assuring coincidence between the tracks T and the reading heads 63 and 64 can be utilized with the error signal $S_3$. For example, in VTR systems in which the capstan is servo controlled, the rotary phase of the capstan motor may be varied to shift the positional relationship between the magnetic tape in the rotary head. Thus, the control signal c would be supplied to the capstan motor in that embodiment.

Alternatively, if a brake assembly is provided for speed control of the drum or capstan, the control signal C may be temporarily supplied to the brake assembly to correct the scanning path of the rotary head as determined by the error signal.

Alternatively, when a reel motor is utilized and servo controlled for fast forward operation and rewind operations, the reel motor speed may be controlled with the control signal c to correct the scanning path of the rotary head.

An alternative apparatus for correcting the scanning of the rotary head can comprise means for changing the running path of the magnetic tape about the drums 61 and 62 wherein, for example, the height of a tape guide 94 is controlled by a solenoid 90 which has a tapered plunger 92 so as to move the tape guide axially as shown by an arrow h in FIG. 3 thus causing the path of tape 60 to vary relative to the drums 60 and 62. FIG. 3 illustrates an input terminal 93 to which the control signal from the control circuit or driver 16 could be supplied for this embodiment.

The situation has been described in which the guard band 2 is formed between two adjacent record tracks. In a VTR in which the rotary heads for recording/reproducing signals are different from each other in azimuth so as to decrease cross-talk components between the adjacent record tracks T and guard bands are not formed between the adjacent record tracks T, there is the danger that the rotary heads will scan the record tracks T with a different azimuths and therefore the VITC signal might not be correctly reproduced. However, according to the present invention, positional relationship between the magnetic tape and the rotary head is changed with the control signal c and the frame number can always be read and displayed.

Thus, in the present invention, at any time in which the track address signals are not correctly read out, a control signals will be obtained so as to change the positional relationship between the magnetic tape and the rotary head and such control signal is utilized for adjusting the relationship between the reading heads and the tape such that the correct address signal can be read from the tape and displayed on the display device. Thus, the invention assures that the track address signal will always be available and indicated on the indicator 17.

Although the invention has been described with respect to preferred embodiments thereof, it is not to be so limited as changes and modifications may be made which are within the full intended scope as defined by the appended claims.

We claim as our invention:

1. Apparatus for correctly reading VITC signals recorded on slant tracks of the magnetic video tape with a video tape recorder reproducer having rotating drums and scanning heads and motor means for driving said heads comprising, a VITC separator receiving the detected signals from said scanning heads and separating the address signals, a VITC decoder receiving the output of said VITC separator and decoding the various address signals, an indicator connected to said VITC decoder and indicating the various addresses such as hours, minutes, seconds and frame or field, a timer receiving an input from said VITC decoder, a comparator receiving inputs from said timer and said VITC decoder and producing an output signal indicative of the synchronization error between said video tape and said scanning heads, and synchronization correction means connected to the output of said comparator to assure synchronization between said video tape and said scanning heads.

2. Apparatus according to claim 1 wherein said synchro-ization correction means supplies an input to said motor means for driving said heads.

3. Apparatus according to claim 2 wherein said synchronization circuit includes a control circuit receiving the output of said comparator, a phase shift circuit receiving a reference signal and the output of said control circuit, means detecting the rotational speed of said motor means for driving said heads, a phase comparator receiving the outputs of said phase shift circuit and said means detecting the rotational speed of said motor means and producing an output signal which is supplied to said motor means to synchronize it.

4. Apparatus according to claim 3 further including a low pass filter connected between said motor means and said phase comparator.

5. Aparatus according to claim 1 wherein said synchronization correction means includes means for axially moving said video tape relative to said rotating drums and the output of said comparator connected to said means for axially moving said video tape.

6. Apparatus according to claim 1 wherein said timer produces an output signal which has a length in time indicative of a synchronization between said heads and said video tape.

* * * * *